Feb. 5, 1957  H. P. KUEHNI  2,780,404
FLUID COMPRESSOR
Filed July 21, 1953
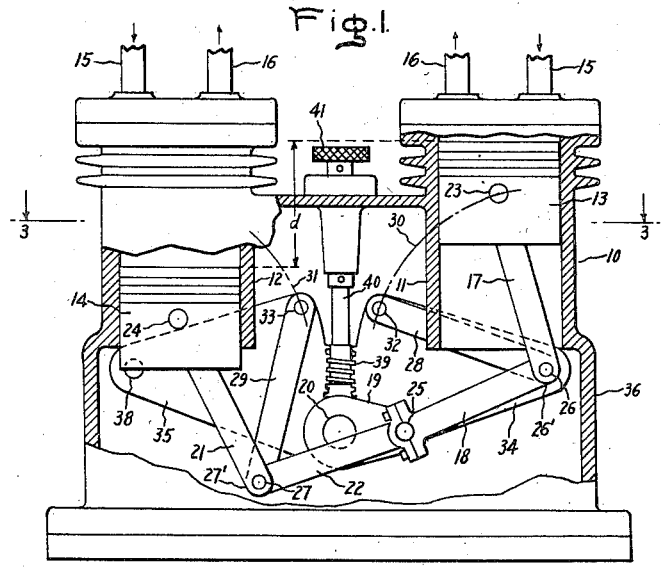
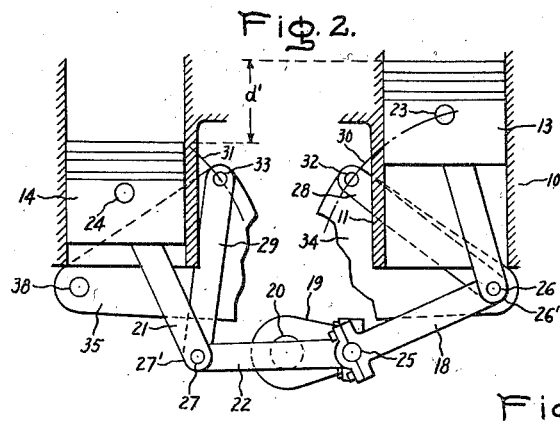
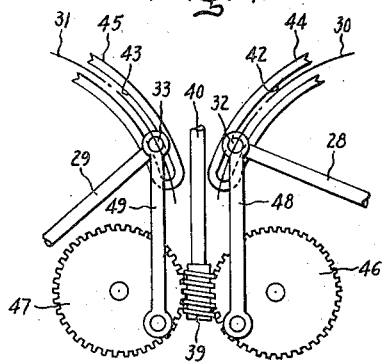
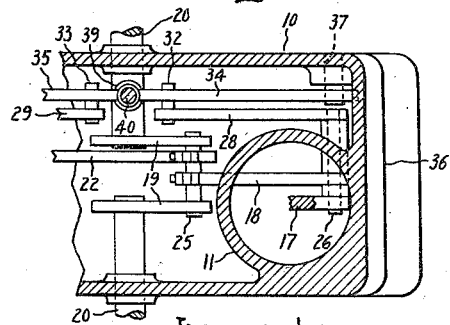
Inventor:
Hans P. Kuehni,
by Paul A. Frank
His Attorney.

United States Patent Office 2,780,404
Patented Feb. 5, 1957

2,780,404

FLUID COMPRESSOR

Hans P. Kuehni, Schenectady, N. Y., assignor to General Electric Company, a corporation of New York Application July 21, 1953, Serial No. 369,273

1 Claim. (Cl. 230—20)

My invention relates to fluid compressors, and more particularly to fluid compressors having a wide range of adjustment in their fluid displacement capacity so as to be suitable for use in refrigerating or heat pumping systems subjected to wide fluctuations in their heating or cooling requirements.

In order to meet the wide range of fluid pumping requirements made upon the compressor in certain refrigerating and heat pumping systems, it has been common practice to reciprocate the piston of the compressor at constant speed but with adjustable length of stroke. This system has the advantage that an inexpensive and reliable constant speed induction motor can be employed and hermetically sealed within the compressor, but has heretofore suffered from the disadvantage that it has been very difficult to obtain high efficiency of compression as the length of stroke is varied especially where short lengths of stroke are concerned.

The efficiency of the compressor at different stroke lengths depends in great measure upon the compression ratio which, in turn, depends upon the ratio of maximum to minimum volume within the compressor for each stroke length. Since the maximum volume of the compressor ordinarily varies as the length of stroke is varied, a high compression ratio for different stroke lengths can be obtained only by making the clearance volume of the compressor very small regardless of changes in the length of piston stroke. The minimum clearance volume which can be employed with a particular compressor depends upon many design considerations such, for example, as the refrigerant to be employed. The principal problem involved in maintaining efficiency of the compressor, therefore, is to provide a mechanical control system for adjustably varying the length of the piston stroke while at the same time maintaining the smallest possible clearance volume regardless of the length of stroke.

Accordingly, one object of the invention is to provide an improved variable capacity fluid compressor having high efficiency over a wide range of fluid displacement capacity variation.

Another object of the invention is to provide a fluid compressor of the reciprocating piston type in which the length of stroke can be adjusted over a fairly wide range while maintaining an optimum compression ratio.

An additional object of the invention is to provide a fluid compressor of the reciprocating piston type in which the cyclical maximum volume position of the piston is adjustable over a fairly wide range while maintaining a substantially constant cyclical minimum volume position of the piston. A further object of the invention is to provide mechanical linkage for adjustably varying the length of stroke of a piston in a cylinder while maintaining a desired recurrent position of said piston for a particular angular degree of the reciprocative cycle.

A still further object of the invention is to provide a simple and rugged mechanical linkage between a rotatable crank arm and a reciprocating piston whereby the length of the piston stroke may be variably adjusted over a fairly wide range and yet a predetermined position of the crank arm may be correlated with a particular position of the piston regardless of the length of piston stroke for which the linkage is adjusted.

In general, in accord with the invention two pivotally interconnected links or rods are provided in the compressor extending between a rotatable crank arm and the piston to be reciprocated. A third control or guide link or rod is also pivotally connected on the same pivot axis as the other two interconnected rods and has its other end pivotally supported in a position between the axis of rotation of the crank arm and the point of connection of one of the links to the piston. Means are provided for pivotally supporting this other end of the guide or control rod in different positions along one of the circular loci extending at constant radii from an axis corresponding to the common pivot axis of the three links when the piston is at a predetermined or selected position in the cylinder. As the pivotal support for the control rod is moved along this circular path, the length of piston stroke is varied but the piston always returns to this same predetermined position in the cylinder at a particular rotational position of the crank arm. If the axis of the circular locus corresponds to the common pivot axis of the three links when the piston is at its minimum clearance volume position in the cylinder, the piston always returns to this minimum clearance volume position regardless of the length of stroke as determined by the position of the pivotal support of the control rod along this circular locus.

The novel features believed characteristic of the invention are set forth in the appended claim. The invention itself, however, with further objects and advantages thereof may best be understood by referring to the following description taken in connection with the accompanying drawing in which, Fig. 1 is a side view partly in section of a double piston compressor embodying the invention showing the linkage between the crank arm and the pistons as adjusted for one stroke length, Fig. 2 is a sectional view of the mechanical linkage of the compressor of Fig. 1 as adjusted for a different stroke length, Fig. 3 is a cross-sectional view of the compressor of Fig. 1 taken along line 3—3 of Fig. 1, and Fig. 4 is a side view of alternative mechanical linkage which may be used in accord with the invention to support the control rod of the compressor of Fig. 1 along a circular locus.

Referring to Fig. 1, one form of the invention is shown embodied in a compressor 10 having two vertically arranged cylinders 11 and 12 and two pistons 13 and 14 slidable within respective cylinders 11 and 12. A fluid inlet 15 and a fluid outlet 16 are connected to the top of each cylinder and communicate with the interior thereof. Piston 13 is driven by articulated linkage comprising a piston rod 17 and a drive rod 18 connected between the piston 13 and a crank arm 19. Arm 19 is rotated by a crankshaft 20 driven by any suitable constant speed motor not shown. An articulated linkage comprising piston rod 21 and drive rod 22 is similarly connected between crank arm 19 and piston 14. Piston rods 17 and 21 make pivotal connection with their respective pistons 13 and 14 by being journaled on pivot pins 23 and 24 respectively. Drive rods 18 and 22 make pivotal connection with crank arm 19 by being journaled on a common pintle 25. Piston rod 17 and drive rod 18 are pivotally interconnected on a common pivot axle 26 while piston rod 21 and drive rod 22 are similarly pivotally interconnected on a common pivot axle 27. A control or guide rod 28 for the driving linkage of piston 13 is pivotally connected at one end on axle 26 and thus forms a toggle joint 26' with piston rod 17 and drive rod 18. A control rod 29 for the driving linkage of piston 14 is similarly pivotally connected on pivot axle 27 and forms a toggle joint 27' with piston rod 21 and drive rod 22.

In accord with the invention, for optimum compression ratio at adjustable stroke length, means are provided for pivotally supporting the other end of control rods 28 and 29 in positions adjustable along one of the circular loci between crankshaft 20 and pivot pin 23 extending at a constant radius from a central axis aligned with and corresponding to toggle joint axle 26 when piston 13 is in its minimum clearance volume position as illustrated in Fig. 1. It will be understood that the minimum clearance volume position is when the piston 13 has reached its maximum height within cylinder 11. One such circular locus for piston 13 is indicated by dashed line 30, a corresponding circular locus for piston 14 being indicated by dashed line 31. It is to be understood that although circular locus 30 is indicated as preferably passing through piston pivot pin 23, the circular locus employed may be at a somewhat greater or lesser radius as long as it extends around an axis coinciding with the pivot axis of the toggle connection 26' when the piston is in its minimum clearance volume position. In compressor 10, the pivotal supporting connections to control rods 28 and 29 along their designated circular loci 30 and 31 are provided by means of pintles 32 and 33 respectively carried by gear segments 34 and 35 which are pivoted in the outer casing 36 of compressor 10 on pivot pin 37 (best seen in Fig. 3) and pivot pin 38, respectively. The teeth of gear segments 34 and 35 mesh with a common intermediate worm gear 39. Pintles 32 and 33 upon which control rods 28 and 29 are pivotally mounted are thus simultaneously moved to different positions along the circular loci 30 and 31 when worm gear 39 is rotated by means of a drive shaft 40 attached to an external knob 41.

In Fig. 1, compressor 10 is shown with piston 13 in its minimum clearance volume position while piston 14 is in its maximum volume position for the particular illustrated position of gear segments 34 and 35. It will be appreciated that the length of the piston stroke is equal to the distance d between the top of cylinder 13 in its minimum clearance volume position and the height represented by the top of cylinder 14 in its maximum volume position.

Referring now to Fig. 2, the mechanical piston drive linkage of compressor 10 is shown with gear segments 34 and 35 in different positions as produced by the rotational adjustment of worm gear 39. Crank arm 19 is shown in the same position as in Fig. 1. It will be seen from a comparison of Figs. 1 and 2 that, although drive rod 18 associated with piston 13 assumes the identical position as in Fig. 1, drive rod 22 associated with piston 14 now assumes a different, more horizontal position indicating that the piston stroke length d' has been shortened over the piston stroke length d of Fig. 1 since piston 14 does not fall to as low a level as in Fig. 1. Since crank arm 19 is at its furthermost pushing position relative to piston 13, and at its furthermost pulling position relative to piston 14 in both Figs. 1 and 2, it will be seen that the minimum clearance volume represented by the position of piston 13 remains the same while the maximum fluid displacement capacity represented by the position of piston 14 varies considerably. It will be appreciated that this is because each toggle joint 26' and 27' describe different circular arcs when the other ends of control rods 28 and 29 are in different positions, but that each toggle joint always reaches the same position corresponding to the minimum clearance position of its associated piston as long as the adjustment of the pivotal support of these control rods is along a circular locus coinciding or concentric with loci 30 and 31.

Because of its wide and continuously adjustable range of efficient fluid pumping capacity, a compressor 10 in accord with the invention may conveniently be employed in an automatic temperature-controlled heat pumping system. In order to provide such automatic temperature controlled system, adjustable shaft 40 need only be connected to a thermoresponsive control device, for example, to a reversible motor which is arranged to be energized by an external temperature sensitive element such as a conventional thermostat, and thereby automatically to rotate shaft 40 and adjust the pivotal support of control rods 28 and 29 to predetermined different positions along circular loci 30 and 31 in response to predetermined external temperature levels. Such thermoresponsive control devices are well known to the art and need not be further described here.

Although I have described above a particular embodiment of my invention, many modifications can be made within the teachings of the invention disclosed. Referring to Fig. 4, pivot pins 32 and 33 may, for example, be carried within arcuate slots 42, 43 extending along circular loci 30 and 31 within suitable curved supports 44, 45. Gears 46, 47, driven by worm 39, are then provided which carry adjusting links 48, 49 for moving the pivotal supporting pins 32 and 33 to different positions within their respective slots 42, 43.

It will also be appreciated that control rods 28 and 29 need not necessarily be straight and laterally displaced from drive rod 18 so as to fall external to cylinders 11 and 12, as indicated. Alternatively, control rods 28 and 29 may be curved to pass beneath the cylinder wall. It is to understood, therefore, that I intend by the appended claim to cover all such modifications as fall within the true spirit and scope of the invention.

What I claim as new and desire to secure by Letters Patent of the United States is:

In a fluid compressor comprising a cylinder and a reciprocative piston within said cylinder, a piston rod pivotally connected at one end to said piston, a rotatable crank arm, a drive rod pivotally connected at one end to said crank arm, a control rod having one end pivotally interconnected with the other ends of said piston rod and said drive rod to form a toggle joint therewith, supporting means having a slot extending along a circular locus between said arm and said piston at a constant radius from an axis corresponding to the pivot axis of said toggle joint when said piston is at its minimum clearance volume position in said cylinder, a pivot pin supported within said slot, means for adjusting the position of said pin within said slot, and a pivotal connection of the other end of said control rod on said pivot pin, all of said pivotal connections having pivot axes parallel to said toggle joint pivot axis.

References Cited in the file of this patent

UNITED STATES PATENTS

| 803,149 | Clark | Oct. 31, 1905 |
| 2,044,064 | Dake | June 16, 1936 |
| 2,131,729 | Fee | Oct. 4, 1938 |
| 2,259,713 | Valentine | Oct. 21, 1941 |
| 2,303,597 | Adelson | Dec. 1, 1942 |
| 2,563,939 | Kishline | Aug. 14, 1951 |
| 2,640,425 | Saalfrank | June 2, 1953 |

FOREIGN PATENTS

| 855,890 | France | Feb. 26, 1940 |